United States Patent
Jeong et al.

(10) Patent No.: US 9,692,253 B2
(45) Date of Patent: Jun. 27, 2017

(54) MOBILE TERMINAL AND METHOD FOR CONTROLLING CHARGING AND CHARGER THEREFOR

(71) Applicant: Samsung Electronics Co., Ltd., Gyeonggi-do (KR)

(72) Inventors: Chang-Hoon Jeong, Gyeonggi-do (KR); Chul-Kwi Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 182 days.

(21) Appl. No.: 14/308,106

(22) Filed: Jun. 18, 2014

(65) Prior Publication Data

US 2015/0002079 A1    Jan. 1, 2015

(30) Foreign Application Priority Data

Jun. 26, 2013    (KR) .................. 10-2013-0074000

(51) Int. Cl.
*H02J 7/00*    (2006.01)
*H02J 7/04*    (2006.01)

(52) U.S. Cl.
CPC .............. *H02J 7/04* (2013.01); *H02J 7/0006* (2013.01); *H02J 2007/0062* (2013.01)

(58) Field of Classification Search
CPC ............ H02J 2007/0062; H02J 7/0054; G06F 2213/0042
USPC ................................... 320/105–107
See application file for complete search history.

(56) References Cited

U.S. PATENT DOCUMENTS

| | | | |
|---|---|---|---|
| 8,237,414 B1 * | 8/2012 | Li ...................... | H02J 7/0003 320/103 |
| 2006/0181241 A1 * | 8/2006 | Veselic ................ | G06F 1/266 320/107 |
| 2009/0130874 A1 * | 5/2009 | Englund .............. | H01R 13/645 439/131 |
| 2011/0095722 A1 * | 4/2011 | Chang ................. | H02J 7/0055 320/107 |
| 2012/0104994 A1 | 5/2012 | Esnard-Domerego et al. | |

FOREIGN PATENT DOCUMENTS

| | | |
|---|---|---|
| JP | 2009-118441 A | 5/2009 |
| JP | 2011-8673 A | 1/2011 |

* cited by examiner

*Primary Examiner* — Nghia Doan
(74) *Attorney, Agent, or Firm* — Cha & Reiter, LLC (57) ABSTRACT

Provided is a method for controlling charging in a mobile terminal. The method includes, applying a voltage to a charger upon detecting a connection to the charger via a cable; transmitting a signal for requesting charging to the charger, and switching a charging mode; and charging a power that is received from the charger according to the switched charging mode.

9 Claims, 5 Drawing Sheets

MOBILE TERMINAL AND METHOD FOR CONTROLLING CHARGING AND CHARGER THEREFOR

CROSS REFERENCE TO RELATED APPLICATION

This application claims priority from and the benefit of Korean Patent Application No. 10-2013-0074000, filed on Jun. 26, 2013, which is hereby incorporated by reference for all purposes as if fully set forth herein.

BACKGROUND

Field

The present disclosure relates generally to a mobile terminal and a charger, and more particularly, to a mobile terminal and a method for controlling charging and a charger therefor.

Discussion of the Background

Recently, mobile terminals have been widely popular because they can provide a wide variety of services and useful features. In order to enhance the utilization of mobile terminals and to meet various needs of users, a variety of applications that can run on the mobile terminals have been developed.

According to the developments made in the industries in recent years, a mobile terminal, which is portable and usually has a touch screen, such as a smart phone, a cellular phone, a laptop Personal Computer (PC), and a tablet PC can store a number of, even hundreds of applications, and some of the applications may be displayed on the touch screen of the mobile terminal. The mobile terminal and the applications may be controlled by touch or hovering actions made by a finger or an input unit such as an electronic pen and a stylus pen.

Meanwhile, due to the increasingly diverse and complex functions performed by mobile terminals, battery consumption on the mobile terminals is on the rise. To charge a mobile terminal, a Universal Serial Bus (USB) cable and a detachable Travel Adapter (TA) are often used, and in order to charge with a USB cable, a USB interface having a predetermined number of lines or pins may be used depending on the external design or other requirements. The USB cable may typically include a voltage bus line for supplying power and positive and negative data lines for transmission and reception of data.

However, despite the increase in the battery capacity of mobile terminals, the charging current has not been increased since the conventional USB interface has limits on the allowable current that can be provided per line or pin, which makes it difficult to reduce the charging time and causes user dissatisfaction.

Accordingly, there is a need to increase the charging current and reduce the charging time by making use of the lines or pins of the conventional USB interface that are not being used for charging.

The above information is presented as background information only to assist with an understanding of the present disclosure. No determination has been made, and no assertion is made, as to whether any of the above might be applicable as prior art with regard to the present invention.

SUMMARY OF THE INVENTION

An aspect of the present disclosure is to address at least the above-mentioned problems and/or disadvantages and to provide at least the advantages described below. Accordingly, an aspect of the present disclosure is to provide a mobile terminal and a method for controlling charging.

Another aspect of the present disclosure is to provide a charger and a method for supplying power to a mobile terminal.

In accordance with an aspect of the present disclosure, there is provided a method for controlling charging in a mobile terminal. The method includes, upon detecting a connection to a charger via a cable, applying a voltage to the charger; transmitting a signal for requesting charging to the charger, and switching to a charging mode; and charging a power received from the charger according to the charging mode.

In accordance with another aspect of the present disclosure, there is provided a mobile terminal for controlling charging, including a connection unit configured to connect with a charger via a cable; a controller configured to, upon detecting a connection to the charger, apply a voltage to the charger, to transmit a signal for requesting charging to the charger, and to switch to a charging mode; and a power supply unit configured to charge power received from the charger according to the charging mode.

In accordance with yet another aspect of the present disclosure, there is provided a method for supplying power to a mobile terminal in a charger, including detecting a connection to the mobile terminal via a cable; controlling switching between a plurality of lines included in the cable in response to detecting the connection; and supplying power to the mobile terminal via at least two lines according to the controlled switching.

In accordance with yet another aspect of the present disclosure, there is provided a charger for supplying power to a mobile terminal, including a connection unit configured to connect with the mobile terminal via a cable; and a controller configured to control switching between a plurality of lines included in the cable in response to detecting a connection with the mobile terminal and to supply power to the mobile terminal via at least two lines according to the controlled switching.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It will be understood that when an element or layer is referred to as being "on" or "connected to" another element or layer, it can be directly on or directly connected to the other element or layer, or intervening elements or layers may be present. In contrast, when an element is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 1:
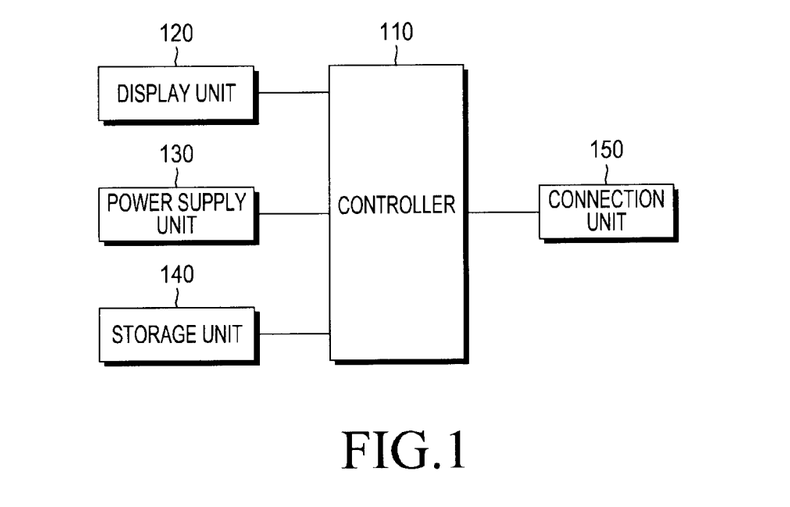
FIG. 1 is a schematic block diagram illustrating a structure of a mobile terminal according to an exemplary embodiment of the present invention.

FIG. 1 is a schematic block diagram illustrating a structure of a mobile terminal according to an exemplary embodiment of the present invention.

Referring to FIG. 1, a mobile terminal 100 may include a controller 110, a display unit 120, a power supply unit 130, a storage unit 140, and a connection unit 150. The mobile terminal 100 may further include a connector 165 illustrated in FIG. 3.

In accordance with one exemplary embodiment, the controller 110 may include a Read Only Memory (ROM) for storing a control program for control of the mobile terminal 100, and a Random Access Memory (RAM) that temporarily stores the signals or data received from the outside of the mobile terminal 100, or is used as a working space for operations performed in the mobile terminal 100. The mobile terminal, to which exemplary embodiments of the present invention are applicable, is a mobile terminal which is portable and capable of data transmission/reception and voice/video calls, and may include at least one touch screen. This mobile terminal may include a smart phone, a tablet PC, a 3-Dimensional Television (3D-TV), a smart TV, a Light Emitting Diode (LED) TV, a Liquid Crystal Display (LCD) TV and the like, and may also include any terminal that can communicate with peripheral devices or other remotely located terminals. The controller 110 may control the display unit 120, the power supply unit 130, the storage unit 140, and the connection unit 150, and may also control the overall operation of the mobile terminal 100.

The controller 110 may detect a connection with a cable or another device, which is connected to the connector 165. Upon detecting the connection of a cable for charging the power supply unit 130 with power, the controller 110 may apply a voltage to the charger connected to another end of the detected cable. In addition, the controller 110 may transmit a signal for requesting charging to the charger via the cable, switch the mobile terminal 100 to a charging mode, and charge the power supply unit 130 with the power that is received from the charger in response to the switched charging mode. How the charging is conducted in the charging mode may vary depending on the level of the current provided from the charger. For example, if the current provided from the charger is 1.8 A, the mobile terminal 100 may receive the current of 1.8 A via a voltage bus line. However, if the current provided from the charger is greater than 1.8 A, the mobile terminal 100 may receive the current via the voltage bus line and an additional arbitrary line. Here, it should be noted that 1.8 A is merely an example, and other cutoff currents, voltages, or any other suitable criteria can be used. In accordance with one exemplary embodiment, the arbitrary line may include a positive data line D+, and in the present disclosure, the mobile terminal 100 may receive the current via at least one other line in addition to the positive data line D+. The cable may connect the connection unit 150 of the mobile terminal 100 to the charger. In accordance with one exemplary embodiment, the terminals connected to the charger may include four USB-type terminals, and the terminals connected to the mobile terminal 100 may include a plurality of terminals (for example, eleven terminals) according to the characteristics of the mobile terminal 100. The controller 110 may switch from a first charging mode that is based on a Voltage BUS (VBUS) line connected to the charger, to a second charging mode that is based on the VBUS line and the positive data line D+. Typically, the cable connected to the charger may include a positive data line D+, a negative data line D−, a VBUS line, and a Ground (GND) line. If the charging is completed or the connection to the charger is released, the controller 110 may transmit a charging ending signal to the charger. In accordance with one exemplary embodiment, the power received from the charger during the charging may be power that is received when a switch between the VBUS line and the positive data line D+ is turned on (i.e., VBUS is connected with D+) and a switch between the positive data line D+ and the negative data line D− is turned off (i.e., when D+ is disconnected with D−) in the charger.

Upon detecting a connection to the charger via a cable or a wireless connection, the controller 110 may transmit a signal to request charging to the charger via the cable or wirelessly. After receiving a response signal from the charger or after transmitting the request signal to the charger, the controller 110 may control switching of the charging mode of the mobile terminal 100. In accordance with one exemplary embodiment, the controller 110 may switch the charging mode of the mobile terminal 100 from the first charging mode that is based on the VBUS line connected to the charger, to a different charging mode that is based on the VBUS line and a data line. The controller 110 may switch the charging mode of the mobile terminal 100 from a first charging mode that is based on the VBUS line connected to the charger, not only to a second charging mode that is based on the VBUS line and the positive data line D+, but also to a third charging mode that is based on the VBUS line and the negative data line D− or any arbitrary or predetermined line. In accordance with one exemplary embodiment, upon detecting a voltage that is output from the charger in response to the voltage applied to the charger, the controller 110 may switch the charging mode of the mobile terminal 100. In addition, upon detecting the connection to the charger, the controller 110 may apply a voltage to the charger, for example, via the negative data line D−, and upon detecting a voltage that is output from the charger, for example, via the positive data line D+, the controller 110 may activate the charging mode.

The connection unit 150 may be used as an interface for connecting the mobile terminal 100 to the external device (not shown) or the power source (not shown). The mobile terminal 100, under control of the controller 110, may transmit the data stored in its storage unit 140 to the external device (not shown) or receive data from the external device (not shown), via a wired cable connected to the connection unit 150. In addition, the mobile terminal 100 may receive power from the power source (not shown) or the charger (not shown) via a wired cable connected to the connection unit 150 or via a wireless connection, or charge a rechargeable battery (not shown) using the power source or the charger. In this way, the connection unit 150 may provide a connection between the mobile terminal 100 and the charger, and the wired cable provided for charging of the mobile terminal 100 may be different depending on its manufacturer. In the wired cable, its terminals connected to the mobile terminal may include eleven terminals, and its terminals connected to the charger may include four terminals, for example.

The storage unit 140, under control of the controller 110, may store signals or data which are input/output via the connection unit 150. The storage unit 140 may store applications and a control program for control of the mobile terminal 100 or the controller 110.

The term 'storage unit' may be construed to include the storage unit 140, the ROM and RAM in the controller 110, or a memory card (not shown) (for example, a Secure Digital (SD) card, a memory stick or the like) mounted in the mobile terminal 100. The storage unit may also include a non-volatile memory, a volatile memory, a Hard Disk Drive (HDD), a Solid State Drive (SSD), or the like.

The power supply unit 130, under control of the controller 110, may supply power to one or multiple batteries (not shown) mounted in the housing of the mobile terminal 100. The one or multiple batteries (not shown) may supply power to the mobile terminal 100. The power supply unit 130 may supply, to the mobile terminal 100, the power that is received from the external power source (not shown) via the wired cable connected to the connection unit 150. Alternatively, the power supply unit 130 may supply, to the mobile terminal 100, the power that is received from the external power source wirelessly by wireless charging technology.

The mobile terminal 100 may include at least one display unit 120 that provides the user with user interfaces corresponding to various services (for example, call service, data transfer service, broadcast service, photo service, and the like). For example, the display unit 120 may be connected to each of multiple hinge-connected housings. The display unit 120 may receive at least one touch by the user's body (for examples, fingers including the thumb) or a touch input unit (for example, a stylus pen, an electronic pen and the like). The term 'touch' as used herein may refer to not only the contact touch but also the contactless touch (for example, hovering) between the display unit 120 and the user's body or the touch input unit.

The display unit 120 may be formed such that a panel for detecting an input by the finger or the input unit based on a change in induced electromotive force and a panel for detecting a contact by the finger or the input unit are stacked one by one to be close to each other or to be partially spaced apart from each other. The display unit 120 may include a plurality of pixels, and display an image using the pixels. The display unit 120 may use a Liquid Crystal Display (LCD) panel, an Organic Light Emitting Diodes (OLED) panel or a Light Emitting Diodes (LED) panel, as its display panel.

Figure 2:
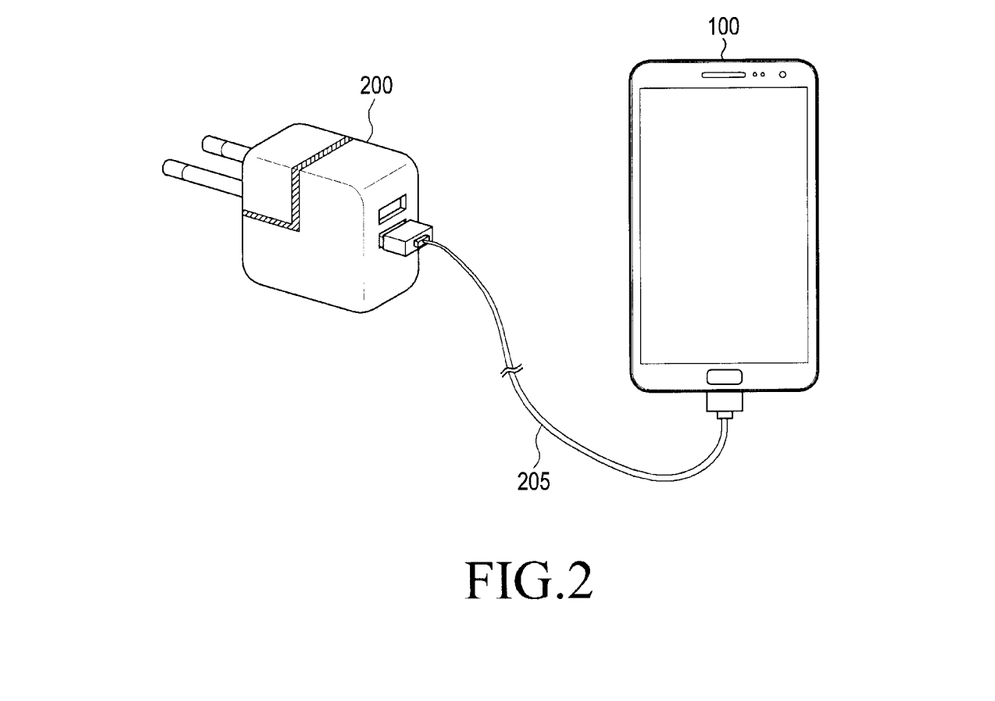
FIG. 2 illustrates a structure for supplying power to a mobile terminal according to an exemplary embodiment of the present invention.

FIG. 2 illustrates a structure for supplying power to a mobile terminal according to an exemplary embodiment of the present invention.

As illustrated in FIG. 2, a structure for supplying power to a mobile terminal according to an exemplary embodiment of the present invention may include a mobile terminal 100, a charger 200 for supplying power received from an external power source to the mobile terminal 100, and a cable 205 for connecting the mobile terminal 100 to the charger 200.

A structure for supplying power to a mobile terminal according to an exemplary embodiment of the present invention will be described in detail below with reference to FIG. 2.

In accordance with one exemplary embodiment, the charger 200 may convert a voltage received from the external power source to supply power to the mobile terminal 100, and may include a USB port. The USB port may include four terminals, but it is an illustrative example and the number of terminals may vary.

Upon detecting its cable connection to the mobile terminal 100, the charger 200 may control switching between multiple lines included in the cable 205 in response to the detection. The charger 200 may supply power to the mobile terminal 100 via at least two lines corresponding to the controlled switching. In accordance with one exemplary embodiment, the charger 200 may turn on a switch (or switching) between the VBUS line and the positive data line D+ included in the cable 205 (i.e., a connection between VBUS and D+ is switched on). The charger 200 may turn off a switch between the positive data line D+ and the negative data line D− connected to the cable 205 (i.e., the connection between D+ and D− is switched off). Further, the switch between the VBUS line and the positive data line D+ and the switch between the negative data line D− and the GND line may be turned off, if a charging ending signal is received from the mobile terminal 100 as the charging is completed or the connection to the charger is released.

The charger 200 may be configured to receive an input voltage from the external power source, adjust the received voltage, and output the adjusted voltage. The charger 200 may be configured to operate with an Alternating Current (AC) external power source such as a household power outlet, or a Direct Current (DC) external power source such as a car power socket. If the external power is AC power, the charger 200 may convert the AC power into DC power. If the external power is DC power, the charger 200 may output the expected adjusted DC voltage. The charger 200 may be configured to generate a periodic signal having the waveform characteristics designed to identify the operating characteristics of the charger. The periodic signal may include a predetermined operating frequency and duty cycle, and may include at least one of the output voltage of the charger, the maximum current capability value, the model number of the charger, and other information related to the operation of the charger.

In accordance with one exemplary embodiment, the cable 205 may have both ends configured in the form of USB, and may include, among others, a positive data line D+, a negative data line D−, a VBUS line, and a GND line, which are connected to their associated lines of the mobile terminal 100. The VBUS line may be a line for outputting a voltage of the charger 200, the positive and negative data lines D+ and D− may be used to transmit a signal of the charger 200, and the GND line may be connected to the ground potential or another ground source.

In accordance with one exemplary embodiment, the mobile terminal 100 may include a connector configured in the form of USB, which can be connected to a USB connector of the charger 200. This connector may be configured in the connection unit 150. Upon detecting connection to the charger 200, the mobile terminal 100 may apply a voltage to the charger 200, transmit a signal for requesting charging to the charger 200, and switch its charging mode. The mobile terminal 100 may charge its rechargeable battery with the power that is received from the charger 200 in response to the switched charging mode. As to the charging mode switching, the mobile terminal 100 may switch from a first charging mode that is based on the VBUS line connected to the charger 200, to a second charging mode that is based on the VBUS line and the positive data line D+, for example.

Figure 3:
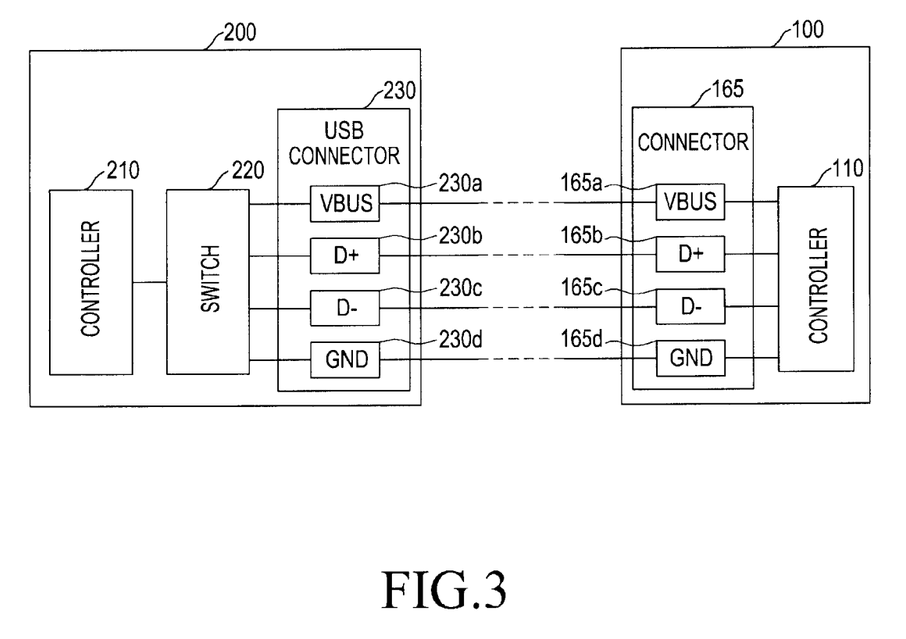
FIG. 3 is a block diagram of a charger and a mobile terminal for supplying power to a mobile terminal according to an exemplary embodiment of the present invention.

FIG. 3 is a block diagram of a mobile terminal and a charger for supplying power to a mobile terminal according to an exemplary embodiment of the present invention.

As illustrated in FIG. 3, a charger 200 for supplying power to a mobile terminal according to an exemplary embodiment of the present invention may include a controller 210, a switch 220 for providing a connection between the controller 210 and a USB connector 230 and switching the connection of each of the terminals formed in the USB connector 230, and the USB connector 230 including a plurality of terminals.

A mobile terminal and a charger for supplying power to a mobile terminal according to an exemplary embodiment of the present invention will be described in detail below with reference to FIG. 3.

The USB connector 230 provided in the charger 200 may include a plurality of terminals or pins. In accordance with one exemplary embodiment, the multiple terminals or pins may include a VBUS line 230a, a positive data line D+ 230b, a negative data line D− 230c, and a GND line 230d, which are connected to the corresponding lines of the mobile terminal 100. The VBUS line 230a may be a line for outputting the voltage of the charger 200, the positive and negative data lines D+ and D− (230b and 230c) may be used to transmit the signal of the charger 200, and the GND line 230d may be connected to the ground potential or another ground source. The switch 220 may connect at least two terminals or pins provided in the USB connector 230, or may release the connections. The switch 220 may control the connection between the VBUS line 230a and the positive data line D+ 230b, and the connection between the negative data line D− 230c and the GND line 230d. The controller 210 may control the overall operation of the charger 200. In the case where the charger 200 wirelessly supplies power to the mobile terminal 100, the controller 210 may control the charger 200 to supply power to the mobile terminal 100 via a wireless connector (not shown).

Upon detecting the cable connection to the mobile terminal 100, the controller 210 of the charger 200 may control switching between multiple lines included in the cable 205. In accordance with one exemplary embodiment, the controller 210 may supply power to the mobile terminal 100, for example, via at least two lines corresponding to the controlled switching. The controller 210 may turn on the connection between the VBUS line and the positive data line D+ included in the cable 205, and turn off the connection between the positive and negative data lines D+ and D− included in the cable 205. As for the switching control, the connection between the VBUS line and the positive data line D+ and the connection between the negative data line D− and the GND line may be switched off, if a charging ending signal is received from the mobile terminal 100 as the charging is completed or the connection to the charger 200 is released.

The mobile terminal 100 may include a connector 165 that can be connected to the external device via the cable 205. In accordance with one exemplary embodiment, the connector 165 may be included in the connection unit 150 shown in FIG. 1. The connector 165 may include a plurality of lines or pins. The connector 165 of the mobile terminal 100 may include, for instance, eleven lines or pins, but it is an illustrative example, and the number of lines or pins may vary depending on the data transmission types. The connector 165 may include a VBUS line 165a, a positive data line D+ 165b, a negative data line D− 165c, and a GND line 165d, which are connected to their corresponding lines of the charger 200. The VBUS line 165a may be a line for receiving a voltage of the charger 200, the positive and negative data lines D+ and D− (165b and 165c) may be used to transmit a signal to/from the mobile terminal 100, and the GND line 165d may be connected to the ground potential or another ground source.

The controller 110 of the mobile terminal 100 may control the overall operation of the mobile terminal 100, and may detect the cable 205 or other devices connected to the connector 165. Upon detecting the connection of the cable 205 for charging the power supply unit 130 with power, the controller 110 may apply a voltage to the charger 200 connected to another end of the detected cable 205. Additionally or alternatively, the controller 110 may transmit a signal for requesting charging to the charger 200 via the cable 205, switch the mobile terminal 100 to a charging mode, and charge the power supply unit 130 with the power that is received from the charger 200 according to the switched charging mode. The charging mode may vary depending on the level of the current provided from the charger 200. For example, if the current provided from the charger 200 is 1.8 A, the mobile terminal 100 may receive the current of 1.8 A via the VBUS line 165a. However, if the current provided from the charger 200 is greater than 1.8 A, the mobile terminal 100 may receive the current via the VBUS line 165a and an additional arbitrary line. In accordance with one exemplary embodiment, the arbitrary line may include the positive data line D+ 165b, and further the mobile terminal 100 may receive the current via at least one other line than the positive data line D+ 165b. The controller 110 may switch from a first charging mode that is based on the VBUS line 165a connected to the charger 200, to a second charging mode that is based on the VBUS line 165a and the positive data line D+ 165b. Alternatively or additionally, whether to charge via one line or at least two lines may be determined based on other conditions, such as the battery level of the mobile terminal 100, its currently charged voltage level, and the amount of current. For example, when the battery is detected to be charged below a certain level (e.g., 50%), the mobile terminal 100 may send a charging request signal to the charger 200 so that the charger 200 charges the battery via at least two lines. The cable 205 connected to the charger 200 may include a positive data line D+, a negative data line D−, a VBUS line, and a Ground (GND) line. If the charging is completed or the connection to the charger 200 is released, the controller 110 may transmit a charging ending signal to the charger 200. The power received from the charger 200 may be power that is received when a connection between the VBUS line 230a and the positive data line D+ 230b is switched on and a connection between the positive data line D+ 230b and the negative data line D− 230c is switched off in the charger 200.

In accordance with one exemplary embodiment, upon detecting the connection to the charger 200 via the cable 205 or a wireless connection, the controller 110 may transmit a signal for request charging to the charger 200 via the cable 205 or wirelessly. After receiving a response signal from the charger 200 or after transmitting the request signal to the charger 200, the controller 110 may control switching of the charging mode of the mobile terminal 100. The controller 110 may switch the charging mode of the mobile terminal 100 from the first charging mode that is based on the VBUS line connected to the charger 200, to a different charging mode that is based on the VBUS line and the data line. The controller 110 may switch the charging mode of the mobile terminal 100 from the first charging mode that is based on the VBUS line connected to the charger 200, not only to a second charging mode that is based on the VBUS line and the positive data line D+, but also to a third charging mode that is based on the VBUS line and the negative data line D− or an arbitrary line. Upon detecting a voltage that is output from the charger 200 in response to the voltage applied to the charger 200, the controller 110 may switch the charging mode of the mobile terminal 100. Additionally or alternatively, upon detecting the connection to the charger 200, the controller 110 may apply a voltage to the charger 200 via the negative data line D−, and upon detecting a voltage that is output from the charger 200 via the positive data line D+, the controller 110 may activate the charging mode.

Figure 4:
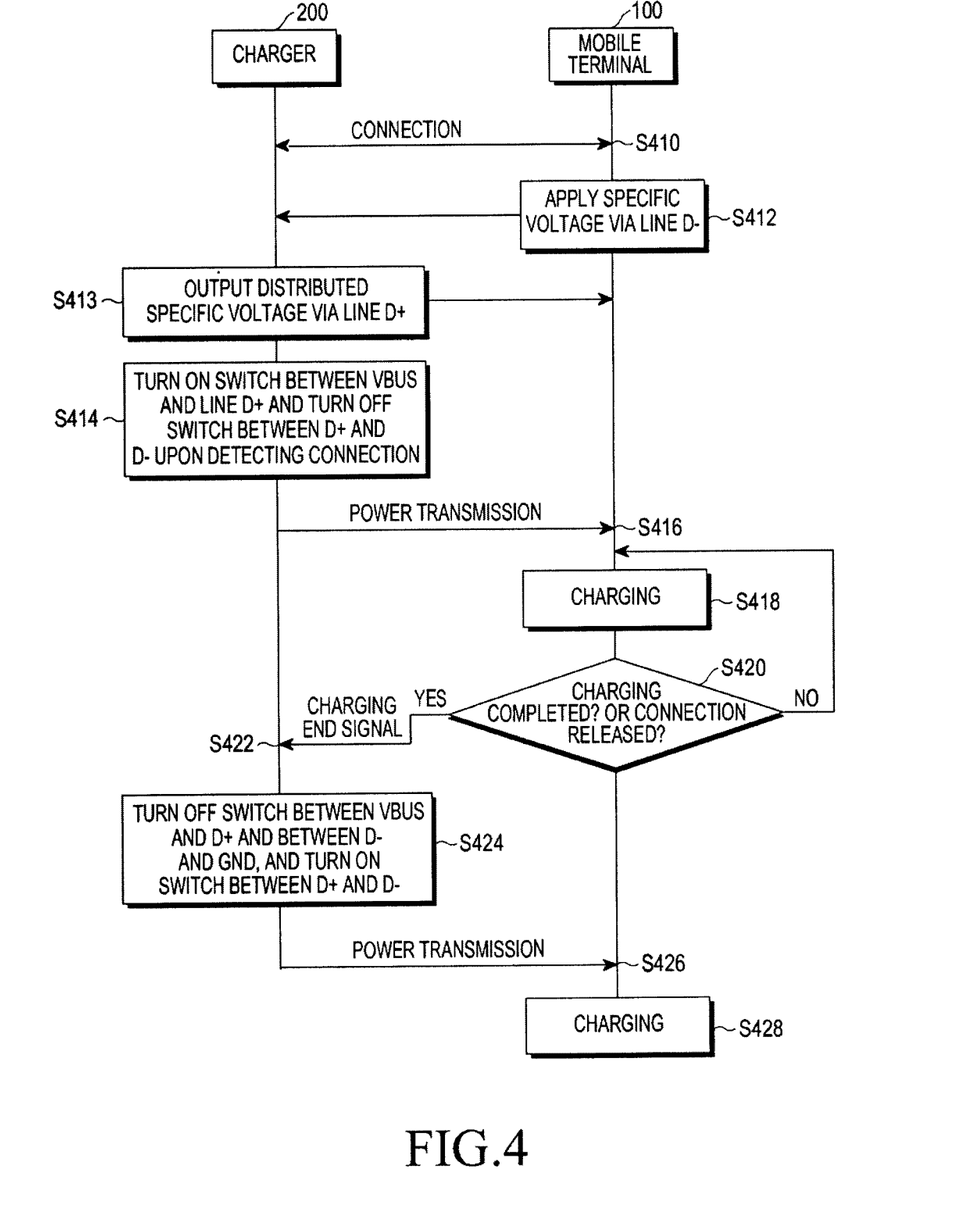
FIG. 4 is a flowchart illustrating a process of supplying power to a mobile terminal according to an exemplary embodiment of the present invention.

FIG. 4 is a flowchart illustrating a process of supplying power to a mobile terminal according to an exemplary embodiment of the present invention.

If a mobile terminal 100 is connected to a charger 200 via a cable 205 or wirelessly to charge the mobile terminal 100 (S410), the mobile terminal 100 may apply a voltage to the charger 200 via a line or lines included in the cable 205 (S412). If the mobile terminal 100 is connected to the external device, for example, the charger 200 via the cable 205 or wirelessly, the mobile terminal 100 may turn into (or switch to) a charging mode. Similarly, if the charger 200 is connected to the mobile terminal 100 via the cable 205 or wirelessly, the charger 200 may also switch to a mode for supplying power to the mobile terminal 100. If the mobile terminal 100 is connected to the charger 200 via the cable 205, the mobile terminal 100 may apply a specific voltage to the charger 200 via the negative line D− configured in the cable 205. In accordance with one exemplary embodiment, this step (S412) may be omitted so that charging begins upon detecting a connection, whether wired or wireless, between the mobile terminal 100 and the charger 200.

The charger 200 may output a voltage to the mobile terminal 100 via the positive data line D+ (S413), and the charger 200 may turn on a connection between the VBUS line and the positive data line D+ and turn off a connection between the positive data line D+ and the negative data line D− (S414). If the mobile terminal 100 is connected to the charger 200, the mobile terminal 100 may apply a voltage to the charger 200 via the negative data line D− in the cable 205. In accordance with one exemplary embodiment of the present invention, the mobile terminal 100 may apply a specific voltage to the charger 200 via other lines or pins except for the negative data line D− in the cable 205.

The charger 200 may supply power to the mobile terminal 100 (S416), and the mobile terminal 100 may charge its rechargeable battery with the power received from the charger 200 (S418). If the voltage applied via the negative data line D− is detected or received, the charger 200 may output a specific voltage to the mobile terminal 100 via the positive data line D+. In accordance with one exemplary embodiment of the present invention, the charger 200 may output a specific voltage to the mobile terminal 100 via other lines or pins than the positive data line D+ in the cable 205. Upon detecting its connection to the mobile terminal 100, the charger 200 may turn on the connection between the VBUS line and the positive data line D+ in the cable 205, and turn off the connection between the positive data line D+ and the negative data line D−. This switching is made, among others, to supply power to the mobile terminal 100 via at least two lines. In other words, the charger 200 may supply power to the mobile terminal 100 via the VBUS line and the positive data line D+. Based on this switching structure, the mobile terminal 100 may charge its rechargeable battery with twice as much power as it would via one line, thereby contributing to a reduction in the charging time.

If the charging is completed or the connection is released (S420), the mobile terminal 100 may transmit a charging ending signal to the charger 200 (S422). If the charging is completed or the connection is released, the mobile terminal 100 may transmit the charging ending signal to the charger 200, for example, via at least one of the negative data line D− and the positive data line D+.

Upon receiving the charging ending signal, the charger 200 may turn off the connections between the VBUS line and the positive data line D+ and between the negative data line D− and the GND line, and turn on the connection between the positive data line D+ and the negative data line D− (S424). If the charging is completed or the cable connection is released, the charger 200 may return its mode to the initial state, or may turn off the connections between the VBUS line and the positive data line D+ and between the negative data line D− and the GND line, and turn on the connection between the positive data line D+ and the negative data line D−.

Figure 5A:
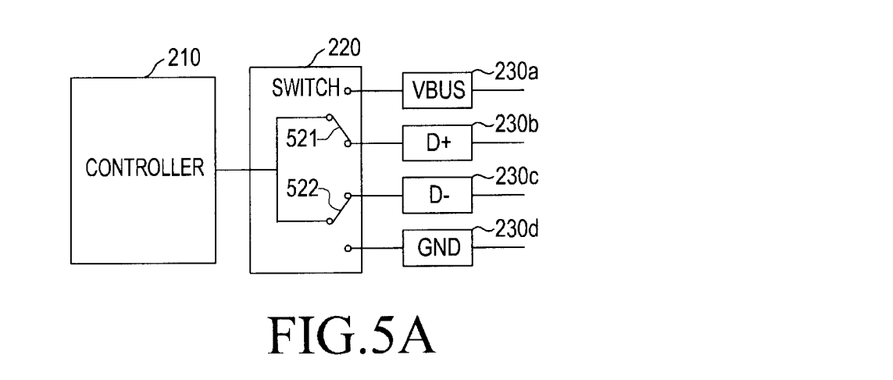
FIG. 5A illustrates switching of a charger before power is supplied to a mobile terminal.
Figure 5B:
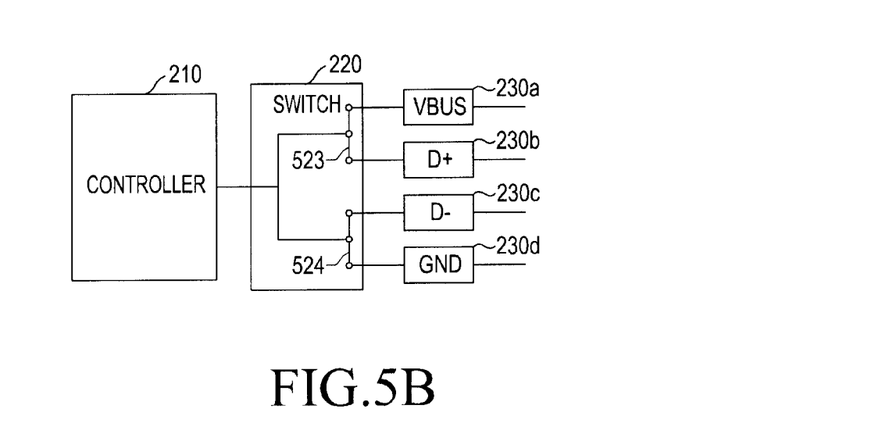
FIG. 5B illustrates switching of a charger supplying power to a mobile terminal.

FIGS. 5A and 5B illustrate switching of a charger for supplying power to a mobile terminal according to an exemplary embodiment of the present invention.

Specifically, FIG. 5A illustrates switching of a charger before power is supplied to a mobile terminal, and FIG. 5B illustrates switching of a charger supplying power to a mobile terminal.

A switching operation of a charger for supplying power to a mobile terminal according to an exemplary embodiment of the present invention will be described in detail below with reference to FIGS. 5A and 5B.

If a voltage that is applied from the mobile terminal 100 via the negative data line D– is detected or received via the negative data line D– 230c of the USB connector 230, the controller 210 may control the switch 220 as shown in FIG. 5A to output a specific voltage to the mobile terminal 100 via the positive data line D+ 230b of the USB connector 230. The switch 220, under control of the controller 210, may activate or turn on the positive data line D+ 230b and the negative data line D– 230c. In other words, the switch 220 may connect the controller 210 to the positive data line D+ via a switch 521, and connect the controller 210 to the negative data line D– via a switch 522. If a voltage is received from the mobile terminal 100 via the negative data line D– or if a voltage is output to the mobile terminal 100 via the positive data line D+, the controller 210 may detect the connection to the mobile terminal 100, and control the switching operation of the switch 220 as shown in FIG. 5B. In other words, the controller 210 may connect the positive data line D+ 230b to the VBUS line 230a via a switch 523, and connect the negative data line D– 230c to the GND line 230d via a switch 524. In this way, by connecting the positive data line D+ 230b to the VBUS line 230a via the switch 523, and connecting the negative data line D– 230c to the GND line 230d via the switch 524, the controller 210 may supply power, which is greater than the power that the charger 200 can supply to the mobile terminal 100 via the VBUS line 230a only.

Figure 6:
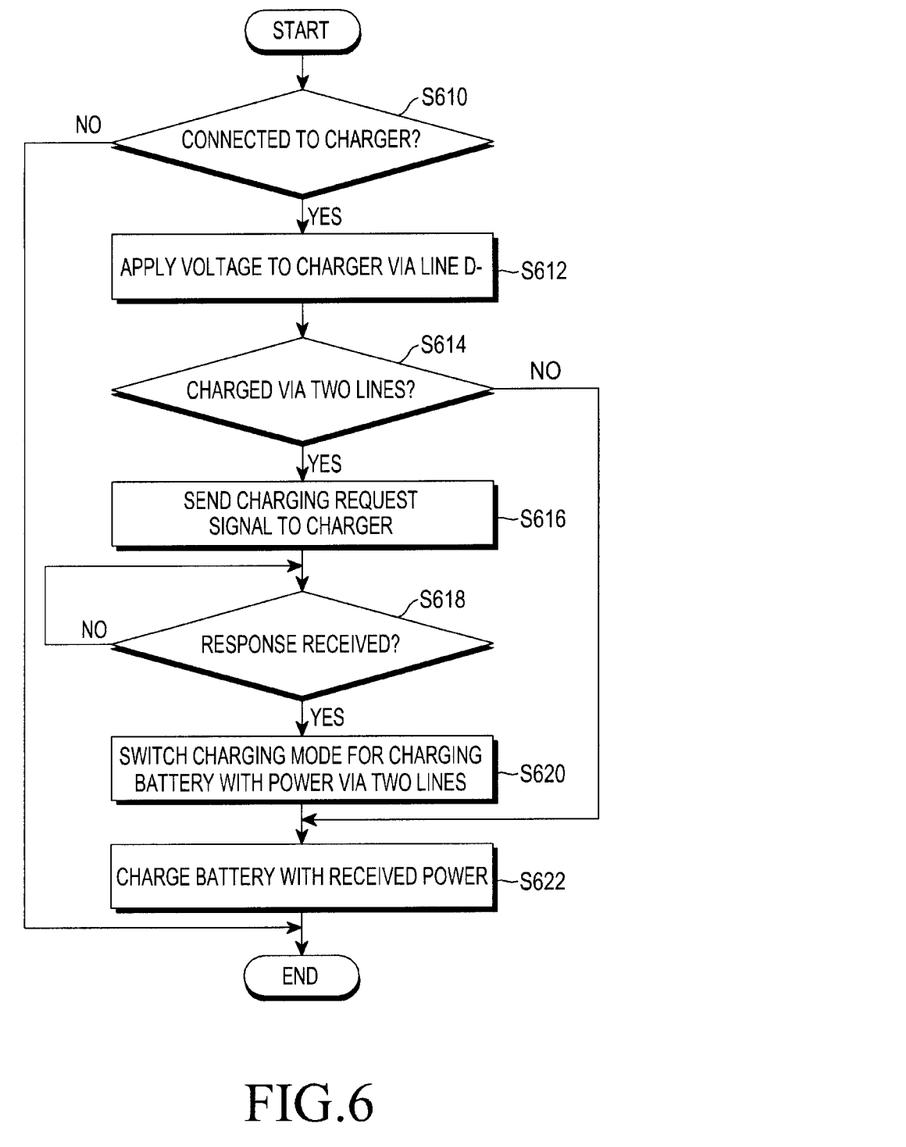
FIG. 6 is a flowchart illustrating a process of controlling charging in a mobile terminal according to an exemplary embodiment of the present invention.

FIG. 6 is a flowchart illustrating a process of controlling charging in a mobile terminal according to an exemplary embodiment of the present invention.

A process of controlling charging in a mobile terminal according to an exemplary embodiment of the present invention will be described in detail below with reference to FIG. 6.

If the mobile terminal 100 is connected to the charger 200 (S610), the mobile terminal 100 may apply a voltage to the charger 200 via the negative data line D– (S612). In accordance with one exemplary embodiment, upon detecting the connection to the charger 200 via the cable 205, the mobile terminal 100 may apply a voltage to the charger 200 via the negative data line D– provided in the connector 165. Alternatively, upon detecting the connection to the charger 200, the mobile terminal 100 may apply a voltage to the charger 200 via other lines than the negative data line D–. This voltage may be applied to inform the charger 200 of the battery level such as the currently charged voltage level and the amount of current.

If the mobile terminal 100 is to charge its rechargeable battery via at least two lines, or if the mobile terminal 100 is to charge its rechargeable battery with higher power compared to when it charges the battery via a single line (S614), the mobile terminal 100 may transmit a charging request signal to the charger 200 (S616). The charging request signal may include information about the maximum voltage and current with which the mobile terminal 100 can charge its rechargeable battery. The charging request signal may include information indicating that the mobile terminal 100 can be charged via two lines (for example, the VBUS line and the positive data line D+). After transmitting the charging request signal to the charger 200, the mobile terminal 100 may switch to the charging mode. The charging mode may vary depending on the level of the current received from the charger 200. For example, if the current received from the charger 200 is 1.8 A, the mobile terminal 100 may receive a current of 1.8 A via the VBUS line. If the current received from the charger 200 is greater than 1.8 A, the mobile terminal 100 may receive a current via the VBUS line and an additional arbitrary line. Alternatively or additionally, whether to charge via one line or at least two lines may be determined based on other conditions, such as the battery level of the mobile terminal 100, its currently charged voltage level, and the amount of current. For example, when the battery is detected to be charged below a certain level (e.g., 50%), the mobile terminal 100 may send a charging request signal to the charger 200 so that the charger 200 charges the battery via at least two lines.

Upon receiving a response to the charging request signal from the charger 200 (S618), the mobile terminal 100 may switch to a charging mode for charging its rechargeable battery with power via two lines (S620), and charge its rechargeable battery with the received power (S622). The term 'switching' as used herein may refer to an operation of switching from a first charging mode that is based on the VBUS line connected to the charger 200, to a second charging mode that is based on the VBUS line and the positive data line D+. As to the switching, upon detecting a voltage output from the charger 200 in response to the applied voltage, the mobile terminal 100 may switch its charging mode. The received power may be power that is received when the connection between the VBUS line and the positive data line D+ is switched on in the charger 200. In this case, for the charger 200, the connection between the positive data line D+ and the negative data line D– may be switched off.

It can be appreciated that exemplary embodiments of the present invention may be implemented by hardware, software, or a combination thereof. The software may be stored in a volatile or non-volatile storage (for example, erasable or rewritable ROM), a memory (for example, RAM, memory chip, memory device, memory Integrated Circuit (IC) and the like), or an optically or magnetically writable machine (or computer)-readable storage medium (for example, Compact Disk (CD), Digital Versatile Disk (DVD), magnetic disk, magnetic tape and the like). The memory that can be mounted in the mobile terminal may be an example of the machine-readable storage media suitable to sore a program or programs including instructions for implementing exemplary embodiments of the present invention. Therefore, the present invention may include a program including code for implementing the apparatus and method defined by the appended claims, and a machine-readable storage medium storing the program. The program may be electronically transmitted via any media such as communication signals which are transmitted through wired/wireless connections, and the present invention may include their equivalents.

The mobile terminal may receive and store the program from a program server to which it is connected by wires or wirelessly. The program sever may include a memory for storing a program including instructions for performing the charging control method of the mobile terminal, and information needed for the charging control method, a communication unit for performing wired/wireless communication with the mobile terminal, and a controller for transmitting the program to the mobile terminal automatically or at the request of the mobile terminal.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling charging in a mobile terminal, the method comprising:
applying a voltage to a charger upon detecting, by a controller of the mobile terminal, a connection to the charger via a cable;
transmitting, by the controller, a signal for requesting charging to the charger;
switching, by the controller, from a first charging mode based on a Voltage BUS (VBUS) line connected to the charger to a second charging mode based on the VBUS line and a positive data line (D+); and
charging a power received from the charger according to the switched charging mode,
wherein the switching further comprising:
switching ON a connection between the VBUS line and the positive data line (D+); and
switching OFF a connection between the positive data line (D+) and a negative data line (D−) connected to the charger.

2. The method of claim 1, wherein the switching comprises switching to the charging mode upon detecting a voltage output from the charger in response to the applied voltage.

3. The method of claim 1, wherein the cable comprises the positive data line (D+), the negative data line (D−), the VBUS line, and a Ground (GND) line.

4. The method of claim 1, further comprising transmitting a charging ending signal to the charger, if the charging is completed or the connection to the charger is released.

5. The method of claim 1, wherein the received power is power received in response to detecting that a connection between the VBUS line and the positive data line (D+) is switched on and a connection between the positive data line (D+) and the negative data line (D−) is switched off in the charger.

6. A mobile terminal for controlling charging, the mobile terminal comprising:
a connection unit configured to connect with a charger via a cable;
a controller configured to:
upon detecting a connection to the charger, apply a voltage to the charger,
transmit a signal for requesting charging to the charger,
switch from a first charging mode based on a Voltage BUS (VBUS) line connected to the charger to a second charging mode based on the VBUS line and a positive data line (D+); and
a power supply unit configured to charge power received from the charger according to the switched charging mode,
wherein the controller is further configured to:
switch ON a connection between the VBUS line and the positive data line (D+); and
switch OFF a connection between the positive data line (D+) and a negative data line (D−) connected to the charger.

7. The mobile terminal of claim 6, wherein the controller is configured to switch to the charging mode upon detecting a voltage output from the charger in response to the applied voltage.

8. The mobile terminal of claim 6, wherein the received power is power received in response to detecting that a connection between the VBUS line and the positive data line (D+) is switched on and a connection between the positive data line (D+) and the negative data line (D−) is switched off in the charger.

9. The mobile terminal of claim 6, wherein the controller is configured to upon detecting the connection to the charger, apply a voltage to the charger via the negative data line (D−), and activate the charging mode upon detecting a voltage received from the charger via the positive data line (D+).

* * * * *